3,394,010
PROCESS FOR TREATING POTATO SLICES WITH A CROSS-LINKING AGENT
William Miller, Houlton, Maine, assignor to A. E. Staley Manufacturing Company, Decatur, Ill., a corporation of Delaware
No Drawing. Continuation-in-part of application Ser. No. 401,661, Oct. 5, 1964. This application Oct. 13, 1967, Ser. No. 675,053
16 Claims. (Cl. 99—100)

ABSTRACT OF THE DISCLOSURE

Slices of peeled, raw potatoes are surface treated with an aqueous media containing cross-linking agents such as phosphorous oxychloride and epichlorohydrin to provide intermediate materials which fry into potato products of improved appearance, feel and taste.

---

This application is a continuation-in-part application of my pending application Ser. No. 401,661, filed Oct. 5, 1964, and now abandoned.

Disclosure of the invention

This invention relates to a process for treating potato slices to improve the physical properties and taste of cooked products prepared therefrom. More particularly, the invention pertains to such a process for treating slices of raw, peeled potatoes prior to the preparation therefrom of potato chips, french fried potatoes or the like, and which imparts, inter alia, improved crispness and flavor to the cooked products.

In the following specification, all parts and percentages are by weight, unless otherwise indicated.

It has heretofore been difficult to impart the desired crispness or so-called casing quality to fried potato products, without over-frying. Such fried products are subject to rehydration of the surface crust thereof, resulting in a loss of crispness and a consequent undesired limp or soggy condition prior to consumption. Hence, there are not any presently available commercial procedures for insuring that fried potato products possess and retain the proper casing quality.

A further problem inherent in the processing of potatoes arises from the fact that the starch content thereof is converted to reducing sugars when stored at relatively low temperatures during the winter months. It is known that if the reducing sugar content of a potato is unsuitably high, namely over about 0.3% of the total weight, cooked potato products, e.g., potato chips, prepared therefrom will possess dark colors and be bitter tasting, due to the formation of hydroxymethyl furfural produced by the interaction of various amino acids present and such reducing sugars. In order to minimize such undesirable side-effects, it is conventional, where necessary, to subject raw potatoes prior to cooking to treatments which are effective to suitably lower the reducing sugar content. One commonly employed treatment involves subjecting the raw potatoes to storage under conditions of controlled temperature and humidity. This treatment, which is known as curing, usually is carried out at temperatures in the range of 70°–85° F. at a relative humidity of 80–85% for periods of one to four weeks. The treatment effects a reversal of the equilibrium between starch and sugar formation, resulting in a typical treatment in a conversion of about 20% of the reducing sugars to starch and an elimination of about 80% as water and carbon dioxide. Alternative pretreatments to lower the reducing sugar contents of potatoes include the use of soaking solutions such as water, dilute acid solutions, and combinations of such treatments with temperature curing. While such pretreatments have been successful in improving some characteristics of cooked products obtained from potatoes, they generally have failed to offer improvement with regard to crispness.

It is among the objects of the present invention to provide a process for treating raw potatoes to modify the surfaces thereof such that, after cooking, the potato product possesses an increased, more durable crispness. An additional object of the invention is to provide such a process which may be utilized to prepare cooked potato products possessing improved color and flavor characteristics.

Additional objects and advantages of the invention will be more apparent from a consideration of the following detailed description thereof.

In accordance with the present invention, it has been found that the physical properties and taste of cooked potato products may be markedly improved by contacting and reacting raw, peeled potatoes from which such products are prepared with an aqueous medium containing a suitable cross-linking agent to form cross-links between the labile hydrogen atoms on the primary alcohol moieties of the starch and sugar molecules on the surface of the raw potatoes. It has been found that, by virtue of such cross-linking, the potato products produced from the treated potatoes possess markedly superior and long-lasting crispness without abnormally long frying and greatly improved color and flavor, as compared with like products prepared from untreated potatoes.

It is believed that the cross-linking of the labile hydrogen atoms produces a more hydrophobic surface crust on the potatoes treated, thus resulting in the desired improved physical properties and taste characteristics. It will, however, be understood that the precise mechanism, by which the cross-linking of the hydroxyl radicals of the potato molecules effects the improved properties of the present invention, is not known. It is, therefore, intended that the proposed explanation indicated hereinabove should not be construed as limiting.

The cross-linking agents employed in accordance with the present invention comprise materials which are capable of reacting, in an aqueous medium, with the labile hydrogen-containing starch or sugar molecules of the raw potatoes treated. The particular cross-linking agent employed is not critical and any cross-linking agent which provides an edible, pharmaceutically acceptable, modified product containing ether and/or ester cross-linkages is operable in the process of the present invention. Typical cross-linking agents employed in accordance herewith include aliphatic dihalides such as propylene dichloride, dichloropentanes (generally available as mixtures), ethylene dibromide, glycerol dichlorohydrin, and dichlorobutane; ether-forming epoxy halogen compounds such as epichlorohydrin and epibromohydrin; phosphorous-containing compounds such as phosphorous oxychloride, metaphosphates, and polymetaphosphates, e.g. the sodium salts of the latter two; aliphatic acid anhydrides such as succinic anhydride and adipic anhydride. The more preferred cross-linking agents are phosphorous oxychloride, epichlorohydrin and succinic anhydride.

In accordance with the present method, the pH of the aqueous medium employed will vary depending upon the nature of the particular cross-linking agent utilized, the pH corresponding to that conventionally known to promote the reaction of the given cross-linking agent with starch molecules. Usually, the pH of the aqueous media will fall within the range of from about 5 to about 12, by the appropriate addition of an alkali or an acid such as hydrochloric or acetic acid. More generally, the aqueous media is alkaline, e.g. a 0.25–1.0% aqueous solution of an alkali such as sodium hydroxide, sodium carbonate, potassium hydroxide or potassium carbonate. Further details with regard to particular aqueous systems preferred for use with the respective cross-linking agents employed are described in U.S. Patent Nos. 2,500,950; 2,805,220; 2,461,139; and 2,328,537.

In accordance with the present invention, the cross-linking agent is employed in amounts effective to provide a resultant modified product which is less susceptible to hydration and caramelization and develops increased crispness when it subsequently is cooked, e.g. fried. The particular amount of cross-linking agent employed in given embodiments varies depending upon the specific agent employed and the degree of modification desired. Typically, the amount of cross-linking agent consumed in the reaction is less than about 0.1%, and more generally less than about 0.05%, of the potato total weight.

The concentration of cross-linking agent in the reaction medium suitably may vary over a relatively wide range but preferably the reaction medium is dilute with respect to the cross-linking agent, e.g. contains less than about 0.5% cross-linking agent by weight of the aqueous modium. When phosphorous oxychloride is employed as the cross-linking agent, for example, it usually is used at concentrations of at least 0.01%, and in the range of from about 0.015 to 0.35%, by weight of the treating solution. When epichlorohydrin and succinic acid are utilized as cross-linking agents, they usually are employed at concentrations of at least about 0.01% and in the range of from about 0.02 to 0.4%, by weight of the treating solution. Aqueous media containing greater than about 0.5% cross-linking agent suitably may be employed but generally are avoided in that they usually only add to the expense of the process without any attending significant benefits.

The potato reactant employed in the present process is in the form of slices of raw peeled potatoes. The term "slices" as employed herein is intended to refer to relatively large discrete pieces of whole potatoes, as opposed to powders, and includes all usual forms of slices, such as those normally employed for producing potato chips, julienne potatoes, shoestring potatoes, French fried potatoes, and the like. Untreated potato slices and those preliminarily given a conventional pretreatment to reduce enzyme activity, reducing sugar content, and the like are contemplated for use. In the preferred embodiments of the process, the starting potato slices, where necessary, are given a preliminary treatment, exemplified by those described above, to lower the content of reducing sugars present to suitable levels. The use of such a pretreatment improves the characteristics of the cooked potato products ultimately obtained.

In the present process the potato slices employed are brought in contact with, such as being immersed in, the aqueous medium containing the cross-linking agent. The potatoes are maintained in contact with the treating medium for a period sufficient to produce substantially complete cross-linking throughout the surface of the potato slices and effect the treatment of the invention. The temperature at which the treatment is carried out is not critical, typical temperatures, for example, being in the range of from about 40° to about 200° F. Generally it is preferred that the treatment be carried out without gelatinizing the starch present using temperatures within the range of from about 40° to 140° F. Actual time periods employed may vary, preferred periods for given systems depending primarily upon the cross-linking agent employed. In general, the desired surface cross-linking of the potato slices being treated can be achieved using treating time periods of less than about two hours, e.g. from about 30 seconds to about 30 minutes. Phosphorous oxychloride, succinic acid, and sodium polymetaphosphate exemplify cross-linking agents with which such treating time periods generally are employed. Epichlorohydrin, on the other hand, generally requires longer reaction periods to effect the desired surface cross-linking. Typical reaction periods in embodiments using epichlorohydrin as the cross-linking agent usuall fall within the range of from about two hours to about 20 hours. Over treating generally is to be avoided since it tends to result in ultimate less crisp and darker ultimate cooked products. The optimum treating periods for given systems easily may be determined by the routineer.

After maintaining the raw potato slices in contact with the treating aqueous medium for a period sufficient to effect the desired reaction of the cross-linking agent, the potatoes are removed from the media and suitably washed with water to remove residual aqueous treatment medium therefrom. The resultant treated potato slices, if desired, may thereafter be treated to adjust reducing sugar content, as described above, or otherwise treated by conventional operations, such as blanching, prior to cooking. As indicated hereinabove, raw potatoes which have been thus treated have been found to provide fried potato products having increased and more durable crispness, and markedly improved color and flavor, than products prepared from similar untreated potatoes. Particularly preferred results, with regard to improved taste and crispness, are obtained by preparing treated potatoes having a suitably low reducing sugar content, frying the resultant treated potato slices, e.g. deep fat frying the slices at about 325°–375° F. for 2–8 minutes, and freezing the pre-fried product to provide a frozen product which is stored as such and, when desired to be consumed, is reheated such as by re-frying.

The invention having been described in detail, the following examples are provided to show specific embodiments thereof. It will be understood that the examples are presented for illustration purposes only and not by way of limitation.

EXAMPLE 1

15 grams of sodium hydroxide were dissolved in 3,000 cc. of cold (about 42° F.) tap water. Five pounds of raw, peeled french-fry type potato slices then were immersed in the alkaline solution. Thereafter, 1 cc. of phosphorus oxychloride was introduced into the mixture with stirring. The stirring was continued for about 30 seconds and the raw potatoes thereafter permitted to remain in the alkaline medium for a ten-minute period. The potato slices were then removed from the treatment solution and washed thoroughly with cold tap water to remove residual treating solution from their surfaces. The treated potatoes were thereafter blanched and fried in the normal manner.

The resulting fried potatoes possessed substantially superior crispness, color, and flavor characteristics, as compared with a control sample of french fries produced from the same lot, without use of the indicated treatment for effecting cross-linking on the potato surfaces in accordance with the present invention.

EXAMPLE 2

Using slices of potatoes from the same starting batch employed in Example 1, the procedure of Example 1 is repeated to prepare french fried potatoes excepting, after blanching, the treated slices are deep-fat fried at about 325° F. for about 4 minutes, the resultant fried slices are frozen and kept refrigerated overnight, and the frozen slices then are refried at about 375° F. for about 2 minutes.

The resulting fried potatoes have improved crispness as compared to the treated fried potatoes prepared in Example 1.

EXAMPLE 3

About 8 ounces of french fry type slices of raw peeled potatoes were immersed in about 1,000 cc. of an aqueous 0.25% sodium hydroxide solution having a temperature of about 42° F. About 1.5 cc. of epichlorohydrin was then stirred into the mixture and the resultant mixture thereafter was allowed to stand for four hours. The potato slices were washed with water and then deep-fat fried at 350° F. for about 12 minutes.

The resultant fried potato products were superior in crispness, flavor, and color as compared to a control sample of fried potatoes prepared directly without an epichlorohydrin treatment from the same starting lot of potatoes.

EXAMPLE 4

The procedure of Example 3 was repeated for two additional batches of potato slices excepting one batch was allowed to soak in the epichlorohydrin-containing solution for two hours, and the other sample for 17 hours.

In each case the final fried products obtained were superior in overall properties to control fried products prepared without a pretreatment.

EXAMPLE 5

The general procedure of Example 4 was repeated excepting, after being washed, each of the treated samples of potato slices were pre-fried, frozen, and then refried according to the procedure of Example 2.

Each of the resultant fried batches displayed improved crispness as compared to the corresponding treated products obtained in Example 4.

EXAMPLE 6

The general procedure of Example 3 was repeated to prepare fried potatoes excepting about 1 g. of succinic anhydride was substituted for epichlorohydrin, sufficient sodium hydroxide was added to adjust the pH of the aqueous treating medium to about 9.4, and the soaking time of the potato slices in the treating medium was about 20 minutes.

The resultant fried potato slices were superior in crispness, color, and taste characteristics as compared to control fried slices prepared without pretreatment.

EXAMPLE 7

The procedure of Example 6 was repeated excepting, after being washed, the resultant treated potato slices were fried, frozen, and then refried according to the procedure of Example 2.

The resultant fried potato slices had improved crispness as compared to the fried products prepared in Example 6.

EXAMPLE 8

The general procedure of Example 3 was repeated to prepare french fry type potatoes excepting about 1 g. of sodium trimetaphosphate was substituted for epichlorohydrin, sufficient sodium hydroxide was added to adjust the pH of the aqueous treating medium to about 9.7, and the potato slices were soaked in the treating solution for about 20 minutes.

As compared to samples prepared as a control without the use of a pretreatment, the fried potato slices prepared in accordance with the method of the invention displayed superior crispness, color, and flavor.

EXAMPLE 9

The procedure of Example 8 was repeated excepting, after being washed, the resultant treated potato slices were fried, frozen, and refried as in Example 5. The final slices obtained showed improved crispness as compared to the final products of Example 8.

EXAMPLE 10

The general procedures of each of the preceding examples is repeated excepting, prior to being sliced and immersed in the respective treating solutions, the raw potatoes are held at a temperautre of about 75° F. and a relative humidity of about 75% for about two weeks to provide starting whole potatoes having contents of reducing sugars of less than about 0.3%, total weight basis.

The resultant fried potatoes have excellent crispness, color, and flavor properties.

Further embodiments of this invention which do not depart from the spirit and scope thereof, of course, will be apparent to those skilled in the art; accordingly, the foregoing is to be interpreted as illustrative only and the invention will be understool to be limited only by the scope of the appended claims.

What is claimed is:

1. A process for treating slices of raw peeled potatoes to improve the physical properties and taste of cooked potato products prepared therefrom, which comprises contacting and reacting the potato slices with an aqueous medium containing a cross-linking agent to form cross linkages between the labile hydrogen atoms on the primary alcohol moieties of the starch and sugar molecules on the surface of said potato slices.

2. The process according to claim 1, wherein said cross-linking agent is selected from the group consisting of aliphatic dihalides, ether-forming epoxy halogen compounds, phosphorous-containing compounds, and aliphatic acid anhydrides.

3. The process accordng to claim 2, wherein said cross-linking agent is selected from the group consisting of phosphorous oxychloride, epichlorohydrin, and succinic anhydride.

4. The process according to claim 1, wherein the raw potato material employed in said reaction preliminarily is subjected to a treatment to reduce the content of reducing sugars therein.

5. The process according to claim 1, wherein said sliced potato material employed in said reaction contains, on a total weight basis, less than about 0.3% free reducing sugars.

6. The process according to claim 1, wherein, subsequent to said treatment, residual cross-linking agent-containing aqueous medium is removed from the potato slices obtained in said treatment and the resultant treated potato product is fried, then frozen, and thereafter reheated.

7. The method according to claim 1, wherein the concentration of said cross-linking agent in said aqueous medium is less than about 0.5% by weight of said aqueous medium.

8. The process according to claim 6, wherein said cross-linking agent is selected from the group consisting of epichlorohydrin, phosphorous oxychloride and succinic anhydride and the concentration of said cross-linking agent in said aqueous medium is in the range of from about 0.01 to about 0.5% by weight of said aqueous medium.

9. The process according to claim 8, wherein said sliced potato material employed in said reaction contains, on a total weight basis, less than about 0.3% free reducing sugars.

10. The process according to claim 8, wherein said treatment is carried out at a temperature in the range of from about 40° to about 200° F.

11. The process according to claim 10, wherein said cross-linking agent is epichlorohydrin and said treatment is carried out over a time period in the range of from about two hours to about 20 hours.

12. The process according to claim 11, wherein said treatment is carried out under non-gelatinizing temperature conditions.

13. The process according to claim 11, wherein said cross-linking agent is phosphorous oxychloride and said treatment is carried out over a time period in the range of from about 30 seconds to about two hours.

14. The process according to claim 13, wherein said treatment is carried out under non-gelatinizing temperature conditions.

15. The process according to claim 11, wherein said cross-linking agent is succinic anhydride and said treatment is carried out over a time period in the range of from about 30 seconds to about four hours.

16. The process according to claim 15, wherein said treatment is carried out under non-gelatinizing temperature conditions.

References Cited

UNITED STATES PATENTS

| | | |
|---|---|---|
| 2,148,951 | 2/1939 | Maxwell. |
| 3,052,545 | 9/1962 | Ducharme et al. _____ 99—94 X |
| 3,238,193 | 3/1966 | Tuschhoff et al. _____ 260—233.5 |

ALVIN E. TANENHOLTZ, *Primary Examiner.*

D. M. NAFF, *Assistant Examiner.*

UNITED STATES PATENT OFFICE
CERTIFICATE OF CORRECTION

Patent No. 3,394,010                      July 23, 1968

William Miller

It is certified that error appears in the above identified patent and that said Letters Patent are hereby corrected as shown below:

Column 6, line 72 and column 7, line 4, claim reference numeral "11", each occurrence, should read -- 10 --.

Signed and sealed this 24th day of February 1970.

(SEAL)
Attest:

Edward M. Fletcher, Jr.                WILLIAM E. SCHUYLER, JR.
Attesting Officer                         Commissioner of Patents